US008428076B2

(12) United States Patent
Mansharamani

(10) Patent No.: US 8,428,076 B2
(45) Date of Patent: Apr. 23, 2013

(54) SYSTEM AND METHOD FOR PRIORITY SCHEDULING OF PLURALITY OF MESSAGE TYPES WITH SERIALIZATION CONSTRAINTS AND DYNAMIC CLASS SWITCHING

(75) Inventor: Rajesh Mansharamani, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 146 days.

(21) Appl. No.: 13/076,246

(22) Filed: Mar. 30, 2011

(65) Prior Publication Data
US 2012/0076152 A1  Mar. 29, 2012

(30) Foreign Application Priority Data

Sep. 13, 2010 (IN) .......................... 2517/MUM/2010

(51) Int. Cl.
H04L 12/28 (2006.01)

(52) U.S. Cl.
USPC ........... 370/412; 370/413; 370/429; 370/415; 718/103

(58) Field of Classification Search .................. 370/412, 370/413, 415, 419, 429; 718/103–108
See application file for complete search history.

(56) References Cited

U.S. PATENT DOCUMENTS

| 4,794,926 | A | 1/1989 | Munsch et al. |
| 5,333,319 | A | 7/1994 | Silen |
| 6,567,840 | B1 | 5/2003 | Binns et al. |
| 7,065,766 | B2 | 6/2006 | Brenner |
| 7,689,998 | B1 | 3/2010 | Chrysanthakopoulos |

Primary Examiner — Dang Ton
Assistant Examiner — Mandish Randhawa
(74) Attorney, Agent, or Firm — Schmeiser, Olsen & Watts LLP

(57) ABSTRACT

The present invention provides a preemptive priority scheduling system and method for optimal load balancing of messages and preserving the lightweight allocation resources in an intersystem communication. The invention also provides a system and method for scheduling of messages of a plurality of classes in an intersystem communication.

17 Claims, 4 Drawing Sheets

SYSTEM AND METHOD FOR PRIORITY SCHEDULING OF PLURALITY OF MESSAGE TYPES WITH SERIALIZATION CONSTRAINTS AND DYNAMIC CLASS SWITCHING

CROSS REFERENCE TO RELATED APPLICATION

This application claims priority to Indian Patent Application to Mansharamani entitled "A SYSTEM AND METHOD FOR PRIORITY SCHEDULING OF PLURALITY OF MESSAGE TYPES WITH SERIALIZATION CONSTRAINTS AND DYNAMIC CLASS SWITCHING," serial number 2517/MUM/2010, filed Sep. 13, 2010, the disclosure of which is hereby incorporated entirely herein by reference.

FIELD OF THE INVENTION

The present invention relates to a preemptive priority scheduling system and method for optimal load balancing of messages and preserving the lightweight allocation resources in an intersystem communication. More particularly, the invention relates to a system and method for scheduling of messages of a plurality of classes in an intersystem communication.

BACKGROUND OF THE INVENTION

Priority queue, an abstract data type in computer programming is most commonly used in resource allocation for operating systems. Priority queuing has gained industrial importance for communication from back office to front office and for order management systems in manufacturing industries.

It is commonly employed for operating systems in various applications such as telecommunication networks, banking and financial services applications etc.

A typical scheduling system in the current state of art provides priority queuing in First Come First Serve (FCFS) order and thereby provides restrictive serialization, thus lesser priority messages cannot be processed and dispatched in parallel with the high priority messages without restricting the process of the high priority messages.

Another long faced problem in priority scheduling occurs when two high priority messages not related to each other are mapped to the same queue of the processing servers. The typical scheduling system in the current state of art fails to schedule a new process for the second high priority message on any other idle processing servers.

Yet another challenging aspect in priority scheduling of the messages is to provide optimal message load balancing while preserving the serialization constraints for the messages.

Some of the inventions in the current state of art which deals to provide system and methods for priority queue are as follows:

U.S. Pat. No. 7,689,998 to Georgios Chrysanthakopoulos teaches a port-based technique to manage processing resources that can be utilized by an Operating System. Though '998 patent provides priority of a request, which is assumed to be static and known at the time of scheduling, it fails to provide optimal allocation under constraints. Further, '998 patent restricts the assumption for a finite number of priority queues or classes.

U.S. Pat. No. 7,065,766 to Larry Bert Brenner teaches an apparatus and method for load balancing of fixed priority threads in a multiprocessor system. Moreover, '766 patent assumes time slicing and pre-emption of requests in service to deal with load balancing of fixed priority threads across multiple priority queues, where a higher priority thread may displace a lower priority thread. The '766 patent may not be implemented for a serialization constraints associated with at least one thread corresponding to the request class (baseid) and because of time shared implementation the system is not dynamic for plurality of class switching.

U.S. Pat. No. 5,333,319 to Stuart L. Silen teaches a virtual storage data processor for dispatching messages in operating systems for multi programmed data processing systems. The '319 patent maintains common priority of multiple processes serving a given application even if they are across different address spaces; and further deals with serialization through a single threaded execution of a given queue. Though '319 patent teaches improvements in dispatching messages in operating systems for multi programmed data processing systems, it fails to provide optimal load balancing for handling messages of plurality of classes having varied serialization constraints.

U.S. Pat. No. 6,567,840 to Binns et al teaches a method for modeling real-time periodic task scheduling and passing messages within multi task systems. Though '097 patent relates to the area of real time scheduling under deadlines where priority depends on the application characteristics and is inversely proportional to deadline, it fails to discuss about scheduling messages with priority under serialization constraints and optimality of load balancing.

U.S. Pat. No. 4,794,926 to Munsch et al teaches a microcomputer comprising memory and a process which is arranged to execute a plurality of concurrent processes and share its time between them. Though '097 patent discusses about scheduling of processes within a single processor with static priorities attached to each process, it fails to discuss scheduling of process with multiprocessor and dynamic priorities and further does not discuss about elements of serialization.

In light of the above mentioned prior arts it is evident that the current state of art restricts the scheduling of processes within a single multiprocessor having static priorities rather than a multiprocessor with dynamic priorities.

Hence there is a need in the art for a customizable solution for:

1. Prioritizing the scheduling of plurality of messages belonging to plurality of classes based on desired scheduling requirements of a front office system.
2. Achieving optimal load balancing for handling a burst of messages while preserving the serialization constraints.

SUMMARY OF THE INVENTION

Before the present systems and methods, enablement are described, it is to be understood that this invention in not limited to the particular systems, and methodologies described, as there can be multiple possible embodiments of the present invention and which are not expressly illustrated in the present disclosures. It is also to be understood that the terminology used in the description is for the purpose of describing the particular versions or embodiments only, and is not intended to limit the scope of the present invention.

The principle objective of the invention is to provide a preemptive priority scheduling system and method for providing serialization by dynamic switching of a plurality of messages of a plurality of classes in an intersystem communication. The system is envisaged to enable customization of the front office system for desired serialization constraint for scheduling messages priority in an intersystem communication. While implementing the present invention, the resource allocation is maintained lightweight.

In an embodiment of the invention, the invention is implemented on the systems engaged in a typical front office and back office communication. The front office communicating with back office for various business related functions, transactions, and confirmations. Each communication is represented by a processing and transmission of message from front office to back office. The messages are associated with plurality of business transactions and thus can be categorized into plurality of classes. Each class of message has predefined priority and the present invention is adapted to customize the scheduling system and function in accordance with class priority.

Accordingly a dispatcher is modeled to detect priority of message, its function associated with a baseid thereof and class for priority estimation. Every message ideally is expected to be processed in serialized manner in first come first order, however, for purpose of consistency of higher priority messages and for practical implementation of the system, a schedule of present invention is modeled to optimize the load balancing by always making available processing servers for higher priority messages, without affecting scheduling performance for processing lower priority messages.

Accordingly, the scheduling system of the present invention is configured to fully restrict the lower priority messages while processing higher priority messages i.e. fully restrictive mode, partially restrict the lower priority messages while processing higher priority messages i.e. partially restrictive mode and without any restriction on processing of the lower priority messages while processing higher priority messages i.e. non restrictive node.

In one aspect of the invention, a preemptive priority scheduling system of a plurality of messages of a plurality of classes in an intersystem communication, the system comprising of an intersystem communication comprising a front office adapted to handle a plurality of predefined first set of business operations and a back office adapted to handle plurality of second set of business operations, the back office receiving a plurality of messages from the front office in a serialized sequence; a plurality of inbound messages, each message assigned to a pre-identified class, comprising at least one highest priority message, at least one medium priority message and at least one lowest priority message stored in a cache memory of the front office system, wherein each message is assigned with a unique messageid and a class of messages corresponding to at least one pre-identified business activity is assigned a unique baseid; an input message queue adapted to index the queue with messageid and baseid of at least one message residing therein the cache memory of the front office system; a plurality of output server processes running on at least one message output server identified by an assigned serverid thereof, wherein each output server process adapted to invoke a synchronous service call to fetch at least one message from the cache memory corresponding to the indexed messageid in the input message queue and sending messages in first come first serve order to at least one back office system; at least one serialization constraint, pre-identified for priority based message scheduling, comprising of fully restrictive, partially restrictive and non restrictive constraints, each constraint allowing to identify priority of each class of the inbound message and subsequent processing thereof by a scheduling system; a pending list comprising indexed messageid of a pre-identified at least one class of messages having medium priority messages with serialization conflict with the highest priority messages and one or more other priority message classes, wherein the conflicting messageid is fetched from the input message queue in response to the service call from at least one output server process; a restrictive message list comprising indexed baseid of at least one class of messages having lowest priority messages with serialization conflict with the highest priority messages and one or more other priority message classes, wherein the baseid is linked to a linked list pointer thereof; a dispatcher, communicatively coupled with the cache memory of the front office system, dynamically configurable to adapt to at least one serialization constraint, wherein the dispatcher adapted to assign at least one message of at least one class, indexed in the input message queue, to at least one output server process according to predetermined priority thereof for priority based preemptive message transmission to at least one back office node in confirmation with at least one selected message serialization constraint; and a service over queue, communicatively connected to the dispatcher, adapted to assign at least one message to at least one output server process and updating a server process completion flag accessible by the dispatcher, enabling the dispatcher to resume dispatching of at least one new message from the input message queue to at least one output server process.

In another aspect of the invention, a method for preemptive priority scheduling of messages in an intersystem communication causing dynamic class switching of messages corresponding to a selected serialization constraint, the method comprises the computer implemented steps of: receiving a plurality of inbound messages associated with a plurality of message classes from a front office in a serialized sequence into a cache memory of the front office system, each message having pre-assigned priority and a unique messageid and a class thereof a unique baseid, wherein all the related messages corresponding to at least one pre-identified business activity have the same baseid; indexing each inbound message residing therein the cache memory of the front office system according to a serialization constraint, assigned baseid and messageid into an input message queue, wherein the serialization constraint comprising of fully restrictive, partially restrictive and non restrictive constraints, each constraint allowing to identify priority of each class of the inbound message and subsequent processing thereof by a scheduling system; receiving at least one synchronous service call from at least one output service server process running on at least one message output server having a unique serverid for fetching at least one message from the cache memory; communicating a work status of the outbound message processing server's to a dispatcher, wherein the dispatcher is communicatively coupled with the cache memory of the front office system and is dynamically configurable to adapt to at least one serialization constraint; assigning at least one message of at least one class, indexed in the input message queue, to at least one output server process according to predetermined priority thereof for priority based preemptive message transmission to at least one back office node in accordance with at least one selected message serialization constraint; creating a pending list and a restrictive list of messages for swapping the lower priority messages and for further processing thereof in accordance with the associated serialization constraint therewith, wherein the dispatcher swapping and indexing the messageids associated with the lower priority messages and fetching the conflicting messageid from the input message queue in response to the service call from at least one output server process; creating a linked list hash table for storing a pointers for the lower priority messages in the pending list and restrictive list, wherein the hashing is performed in relation to a baseid of each message; transmitting the messages in first come first serve order to at least one back office system; communicating the completion of each message processing associated with each output server, wherein a service over queue, communicatively connected to the dispatcher, adapted to assigning at least one message to at least one output server process and updating a server process completion flag accessible by the dispatcher, enabling the dispatcher to resume dispatching of at least one new message from the input message queue to at least one output server process; and repeating iteratively the message server processes in accordance with the serialization constraint for the messages in the input queue.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings, example constructions of the invention; however, the invention is not limited to the specific methods disclosed in the drawings.

DETAILED DESCRIPTION OF THE INVENTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. The disclosed embodiments are merely exemplary of the invention, which may be embodied in various forms.

Figure 1:
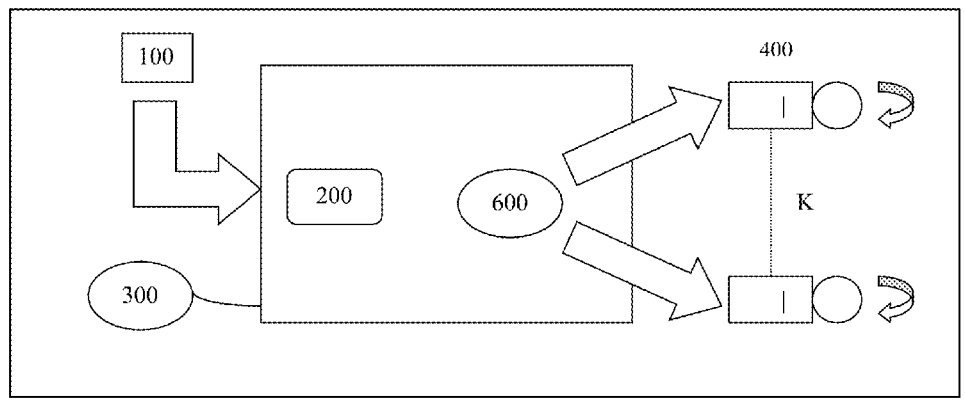
FIG. 1 of the present invention illustrates the schematic representation of a typical scheduler system for priority queuing.

FIG. 1 of the present invention illustrates the schematic representation of a typical scheduler system for priority queuing. According to multiple embodiments of the invention, a preemptive priority scheduling system adapted to provide serialization by dynamic switching of a plurality of messages of a plurality of classes in an intersystem communication, wherein the system comprises of scheduler 300, memory cache 200, at least one outbound message processing server 400, dispatcher 600, router 1100, type 1 dispatcher 1300, M bound output server 1400 and type 2 dispatcher 1600.

The above said system further comprising of: an intersystem communication comprising a front office adapted to handle a plurality of predefined first set of business operations and a back office adapted to handle plurality of second set of business operations, the back office receiving a plurality of messages 100 from the front office in a serialized sequence; a plurality of inbound messages 100, each message assigned to a pre-identified class, comprising at least one highest priority message, at least one medium priority message and at least one lowest priority message stored in the cache memory 200 of the front office system, wherein each message is assigned with a unique messageid and a class of messages corresponding to at least one pre-identified business activity is assigned a unique baseid; an input message queue 500 adapted to index the queue with messageid and baseid 700 of at least one message residing therein the cache memory 200 of the front office system; a plurality of output server processes running on at least one message output server 400 identified by an assigned serverid thereof, wherein each output server process adapted to invoke a synchronous service call to fetch at least one message from the cache memory 200 corresponding to the indexed messageid in the input message queue 100 and sending messages in first come first serve order to at least one back office system; at least one serialization constraint, pre-identified for priority based message scheduling, comprising of fully restrictive, partially restrictive and non restrictive constraints, each constraint allowing to identify priority of each class of the inbound message 100 and subsequent processing thereof by a scheduling system; a pending list comprising indexed messageid of a pre-identified at least one class of messages having medium priority messages with serialization conflict with the highest priority messages and one or more other priority message classes, wherein the conflicting messageid is fetched from the input message queue 500 in response to the service call from at least one output server process; a restrictive message list 1000 comprising indexed baseid of at least one class of messages having lowest priority messages with serialization conflict with the highest priority messages and one or more other priority message classes, wherein the baseid is linked to a linked list pointer thereof; a dispatcher 600, communicatively coupled with the cache memory 200 of the front office system, dynamically configurable to adapt to at least one serialization constraint, wherein the dispatcher 600 adapted to assign at least one message of at least one class, indexed in the input message queue 500, to at least one output server process according to predetermined priority thereof for priority based preemptive message transmission to at least one back office node in confirmation with at least one selected message serialization constraint; and a service over queue 800, communicatively connected to the dispatcher 600, adapted to assign at least one message to at least one output server process and updating a server process completion flag accessible by the dispatcher 600, enabling the dispatcher 600 to resume dispatching of at least one new message from the input message queue 100 to at least one output server process.

According to one of the embodiments of the present invention, the scheduler 300 receives incoming messages 100, which are stored in a memory cache 200; and are further accessed and indexed by the identifier of the memory cache 200 based on the messageid.

Based on the scheduling requirements, the scheduling of incoming messages 100 may be exemplified for a typical brokering system having front office communicating with the back office, the incoming messages may be categorized as either a Type 1 message 100(*a*) e.g., order messages, which includes but not limited to order modifications, cancellations of a given order, wherein the order messages have high priority, so the system can be working in any either fully restrictive or partially restrictive constraints modes, wherein the scheduler is customized to implement a full or partial restriction on lower priority messages while processing the higher priority messages.

Type 2 message 100(*b*) e.g., trade messages, wherein the trade messages have less priority, so the system can be working in either partially restrictive or non restrictive constraints mode, wherein the scheduler is customized to implement a minimal restriction or no restriction on lower priority messages while processing the higher priority messages.

Further, these message types consists of a "baseid", "orderid" and a unique identifier "messageid"; wherein the unique identifier is unique for each and every message while the baseid is same for all messages that are related to each other. For e.g. order confirmation, trade and order cancellation for the same order would have same baseid.

According to another embodiment of the invention, the received incoming messages 100 are then further dispatched on a set of K outbound message processing servers 400 in a First Come First Serve (FCFS) order by the dispatcher 600 of the said scheduler 300.

The K outbound message processing servers 400 makes synchronous calls for processing the incoming message 100 in a FCFS order i.e., they process the next incoming message only after completion of processing of the message at head of the queue.

According to one of the embodiment of the present invention, the typical scheduler system for priority queuing consists of two types of serialization requirements:

R1=It is restrictive scheduling requirement; wherein all messages pertaining to the same baseid are processed in FCFS order. This scheduling requirement is more specifically for Type 1 messages 100(*a*)

R2=It is less restrictive scheduling requirement; wherein the messages may be processed in any order. This scheduling requirement is more specifically for Type 2 messages 100(*b*); wherein the type 1 messages 100(*a*) have higher priority than the type II messages.

According to another embodiment, the present invention follows the following assumptions:

Assumption 1: The output service call takes of the order of 10 ms or more for processing a message. There are at most (K=) 50 output messages being processed concurrently at any time. In other words, at most K=50 output server operating system processes are actively processing messages at any point in time.

Assumption 2: All messages received on that have not been processed by the output server are stored in memory in a cache accessible by the scheduler 600. Each message can be accessed given its messageid.

Figure 2:
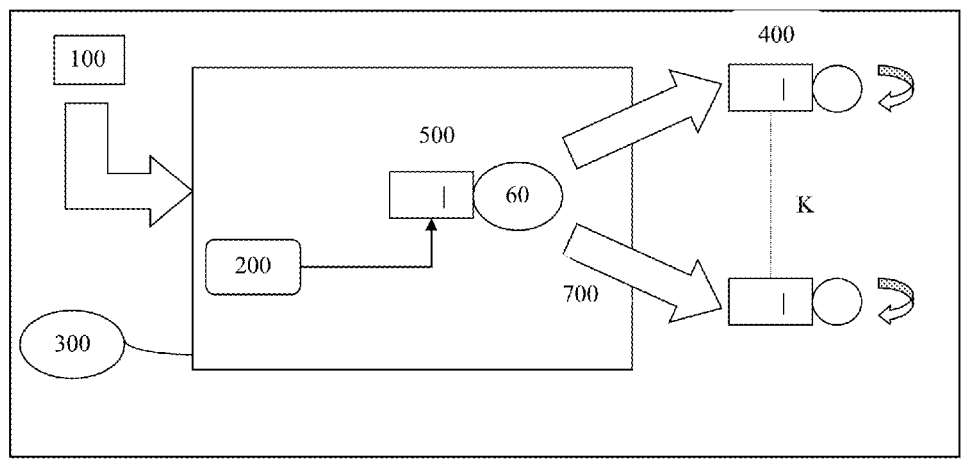
FIG. 2 of the present invention illustrates a typical system for baseline scheduling without load balancing and serialization constraints for priority queuing based on baseid mod K.

FIG. 2 of the present invention illustrates a typical system for baseline scheduling without load balancing and serialization constraints for priority queuing based on baseid mod K. The scheduler 300 of the typical system for baseline scheduling without load balancing and serialization constraints receives the incoming messages 100, which are stored in a memory cache 200; and are further accessed and indexed based on the messageid and baseid by the input message queue 500 of the dispatcher 600.

Further according to another embodiment of the present invention, the incoming message may be a type1 message 100(*a*) or type 2 messages 100(*b*).

According to one of the embodiments of the present invention, the K outbound processing servers 400 makes synchronous calls for incoming message 100 by invoking a service call and does not return until the service call completes the processing.

On receipt of the service call, the input message queue 500 of the dispatcher 600 pulls out and reads a particular stored message having a "messageid" from memory cache 200 in a FCFS order, computes the baseid mod K 700 and then further, dispatches the message to the relevant set of K outbound message processing servers 400; wherein the processes are numbered from 0 to K-1, in a First Come First Serve (FCFS) order.

Further, the stored message would be distributed to K outbound message processing servers 400 based on the baseid given to all the related messages such as but not limited to confirmation, modification, cancellation and trades.

Further, for a given baseid all the related messages would be dispatched to the same server's input queue; wherein the server processes the messages in the queue in FCFS order and thereby fulfills the serialization requirement R1 i.e. restrictive serialization. But one of the disadvantages of the typical system is that the type 2 messages dispatched with the baseid based routing cannot be processed in parallel for a given baseid. Further, if two type 1 messages 100(*a*) with different baseids are mapped to the same queue of the K outbound message processing servers 400; the second message will not be processed on any other idle processing servers.

Figure 3:
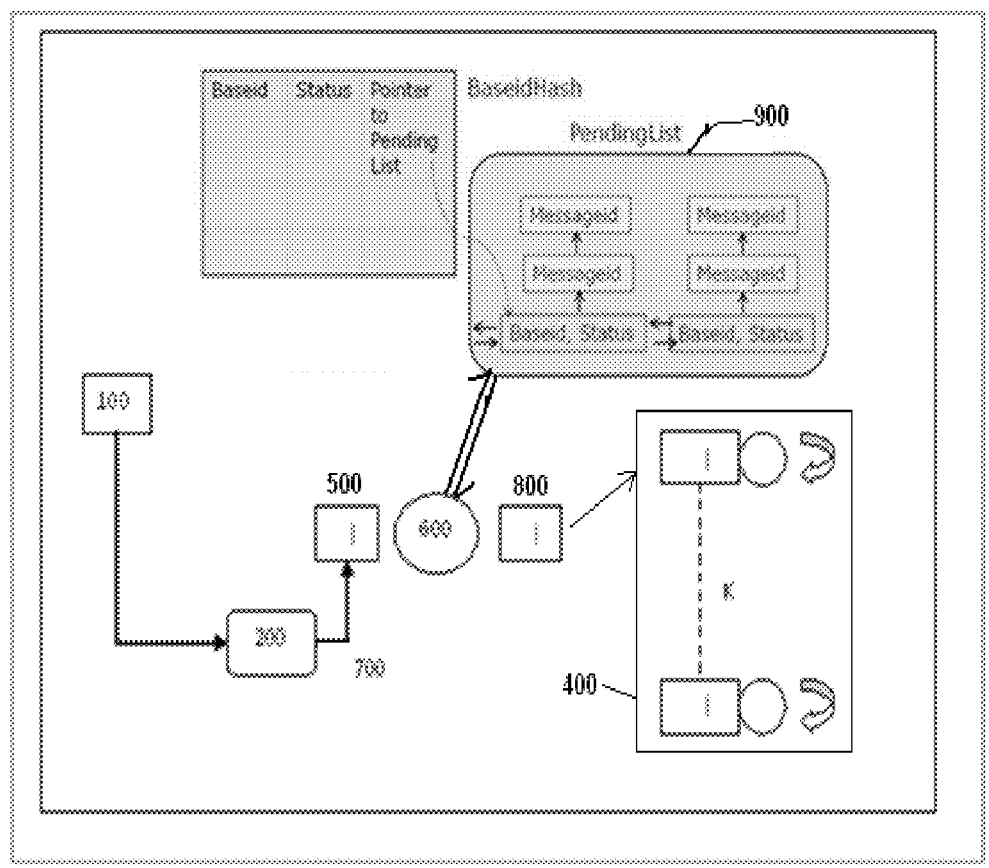
FIG. 3 of the present invention illustrates a scheduling system and method to provide optimal allocation of messages under serialization requirement R1.

FIG. 3 of the present invention illustrates a scheduling system and method to provide optimal allocation of messages under serialization requirement R1.

The Scheduler 600 receives the incoming messages 100, which are stored in a memory cache 200; and are further accessed and indexed based on the messageid and baseid 700 by the input message queue 500 of the dispatcher 600.

According to one of the embodiments of the present invention, the incoming message 100 may be type 1 or type 2 messages.

Further, the dispatcher 600 checks for the serialization requirement R1 against the input message 100, if there are no serialization conflicts then the message is dispatched to the idle output server 400 for processing. But, if there is a serialization conflict, then the dispatcher 600 dispatches the messageid to the pending list of the dispatcher 600.

The logic for Output Server 400 is given below:

```
loop forever
    Wait on queue for next message id;
    Receive messageid;
    Pull out corresponding message from in memory message cache;
    Invoke service for given message and wait for response;
    Send <Serverid, baseid> to SvcOverQ;
end loop
```

Further, service over message queue "SvcOverQ" 800 is used to communicate the process status of the K outbound message processing servers 400 to the dispatcher 600.

During initialization of the scheduler system, the service over message queue "SvcOverQ" 800 has one message 100 for each K outbound message processing servers 400 signifying that all these K outbound message processing servers 400 are ready to do work.

Further, service over message queue "SvcOverQ" 800 provides whether a given process has been completed (Serverid is given for this purpose) by the K outbound message processing server 400.

On completion of the given process by the K outbound message processing server 400; the service over message queue "SvcOverQ" 800 communicates the same to the dispatcher 600.

The dispatcher 600 works only if there is an idle K outbound message processing server 400 available to start the processing.

According to another embodiment of the present invention, the dispatcher 600 reads the messages 100 from input message queue 500 and puts them in the pending message list 900 if they conflict with an existing baseid for a message 100 being processed. If there is no conflict then the message 100 is directly sent to the K outbound message processing servers 400.

The incoming messages 100 are given priority over pending messages in the pending message list 900. The dispatcher 600 further switches to the pending message list 900 to send the pending messages to the K outbound message processing servers 400, when the input message queue 500 is empty.

Further, the "baseid" of the message is set to status "idle"; so that any other idle K outbound message processing servers 400 can pick up the next baseid in the queue for further processing and thereby ensures that messages for a given baseid are not bound to any particular K outbound message processing servers 400.

Once the baseid message is picked up by the idle K outbound message processing servers 400 from the pending message list 900; the status of baseid is changed to "processing"; thereby ensuring that no other baseid message is being processed until the service at the K outbound message processing servers 400 is completed and thereby fulfills the serialization requirement R1 along with optimal load balancing.

Figure 4:
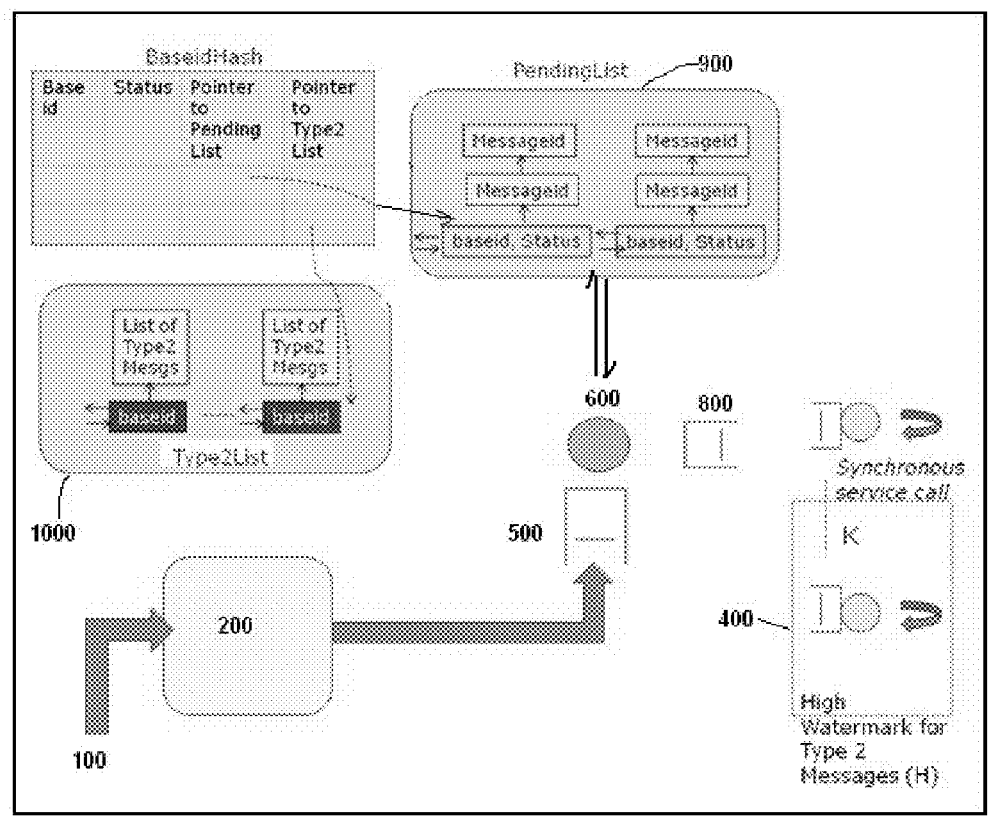
FIG. 4 of the present invention illustrates a scheduling system and method to provide optimal allocation of messages under serialization requirement R2.

FIG. 4 of the present invention illustrates a scheduling system and method to provide optimal allocation of messages under serialization requirement R2.

Incoming messages 100, received by the scheduler system are stored in a memory cache 200; and are further accessed and indexed based on the type of messages, messageid and baseid 700 by the input message queue 500 of the dispatcher 600.

According to one of the embodiments of the present invention, the incoming message 100 may be a type 1 message 100(a) or type 2 message 100(b)

The scheduler system prioritizes the messages under the serialization requirement R2; wherein the type 2 messages 100(b) are not processed in FCFS order for messages that are related to a particular baseid and further the type 2 messages 100(b) have a lower priority as compared to type 1 messages 100(a).

During initialization of the scheduler system, the service over message queue "SvcOverQ" 800 processes one message for each K outbound message processing servers 400 signifying that all these servers are ready to do work.

Further, the service over message queue "SvcOverQ" 800 provides information whether a given process for a K outbound message processing servers 400 has been completed (Serverid is given for this purpose).

On completion of the given output server process; the service over message queue "SvcOverQ" 800 communicates the same to the dispatcher 600. The dispatcher 600 works only if there is an idle K outbound message processing servers 400 available to do the next processing.

Further, the dispatcher 600 checks for the serialization requirement R2 against the input message 100, if a type 1 message 100(a) with high priority is to be processed and there are no serialization conflicts then the type 1 message 100(a) is dispatched to the idle K outbound message processing servers 400 for processing.

In case a type 1 message 100(a) with high priority is to be processed and there is a serialization conflict, then the dispatcher 600 dispatches the messageid of the type 1 message 100(a) to the pending list 900 of the dispatcher 600.

Further, if the input message is a type 2 message 100(b), which has lower priority than type 1 messages 100(a) then the type 2 messages 100(b) are queued in a restrictive message queue "Type2List" (restrictive list) 1000. The restrictive message queue "Type2List" (restrictive list) 1000 gets lower priority as compared to the type 1 messages 100(a) pending in the pending message list 900 as per the serialization requirement R2 and further prevents the clogging of the path for type 1 messages 100(a) on occurrence of a burst of type 2 messages 100(b) (e.g. a trade burst from an exchange).

The restrictive message queue "Type2List" (restrictive list) 1000 comprises of a list of <baseid>nodes (note that there is no status field for these), each of which has a linked list of type 2 messages 100(b) to be processed.

On completion of the processing, the K outbound message processing servers 400, puts across the service over message queue "SvcOverQ" 800 the following message <Serverid, baseid, Type2Flag>; wherein the Type2Flag is TRUE if the last message processed by the server was a type 2 message 100(b) otherwise it is set to FALSE.

The logic for K outbound message processing servers 400 is given below:

```
loop forever
    Wait on queue for next message id;
    Receive messageid;
    Pull out corresponding message from in memory message cache;
    Invoke service for given message and wait for response;
    Send <Serverid, baseid, Type2Flag> to SvcOverQ;
end loop
```

The logic for the dispatcher of scheduling system described in FIG. 4 has the following changes when compared with the logic for the dispatcher of scheduling system described in FIG. 3:

Cleanup:
  If Type2Flag is TRUE then it hashes in to the BaseidHash table and follows the pointer to the Type2 list (restrictive list) for the given <baseid>. If there is no further type2 message in the list it deletes the baseid node in the restrictive list and marks the BaseidHash table entry for Type2 pointer as NULL. If the hash table pointer for pending list is also NULL then it deletes the entry completely from hash table.
  If the Type2Flag is FALSE then the processing is identical to Option S2 with one difference. If there is no message pending for a given <baseid>then the pointer to pending list for the baseid is set to NULL. Only if both pending list and type2 list pointers are NULL can the baseid be removed fully from hash table.
NonBlockingRead:
  The major difference in S3 is that whenever type 2 messages read it is put in to the Type2List (restrictive list). First a check is done against BaseidHash table. If an entry exists for baseid but the type2 pointer is NULL then a new <baseid>node is created in the restrictive list and pointer to this node is added in the hash table. The type2 messageid is inserted in to the linked list for this node. The NonBlockingRead function returns FALSE for a type2 message even if BaseidHash table was empty to start with.

Process From PendingList undergoes no change since PendingList caters only to type1 messages and not to type2 messages.

Process From Type2List (restrictive list): This is a new function to be added last in the main while loop of S2. Essentially the priority is first process new type1 messages, then Pending List messages, and only then type2 messages. In such a case a type2 message is picked up from the restrictive list and sent to the output server which has just finished processing. We could keep a global list of type2 messages but in case there is a burst for a single baseid we would like options for fairness across baseids. In this case, we can go in round robin order across the <baseid>nodes in restrictive list serving one type2 message at a time from each <baseid>node. We anyway have the baseid whenever an output server completes, so moving to the next one in the list should be trivial.

Blocking Read: In this case there is no work to do from PendingList or from restrictive list. Whatever message is read is processed regardless of whether it is a type1 message or type2 message since there is an output server idle. There is an exception to this which we will discuss below.

According to another embodiment of the present invention, the scheduling system further comprises of "High water mark H" on the K outbound message processing servers 400 for servicing the type 2 messages 100(*b*) in instances; wherein the type 2 message 100(*b*) processing is slower than the type 1 message 100(*a*) processing.

The scheduling system further provides lightweight and optimal processing by providing a high overhead service times of the order of several micro seconds in K outbound message processing servers 400. Thus a burst of 1000 type 2 messages 100(*b*) can be easily processed by the dispatcher 600 in one second.

On occurrence of burst of type 2 messages 100(*b*); wherein no type 1 messages are to be processed at the K outbound message processing servers 400, the type 2 messages will be automatically sent to the idle K outbound message processing servers 400 for further processing.

Further, during this process if any type 1 message 100(*a*) comes in then the "High water mark H" on the output server marks the last type 2 message 100(*b*) processed as "H" and switches to process the new available type1 message 100(*a*). On completion of the processing of the type 1 message and if no more type 1 messages are pending then the system switches to the "H" labeled type 2 message and continues the processing of the remaining type 2 messages.

According to one of the embodiments of the present invention, the "High water mark H" is configurable and the dispatcher needs to access it for every cycle. Further, the dispatcher additionally keeps a count of output server processes that services type 2 messages and ensure that they are well within the water mark H.

Figure 5:
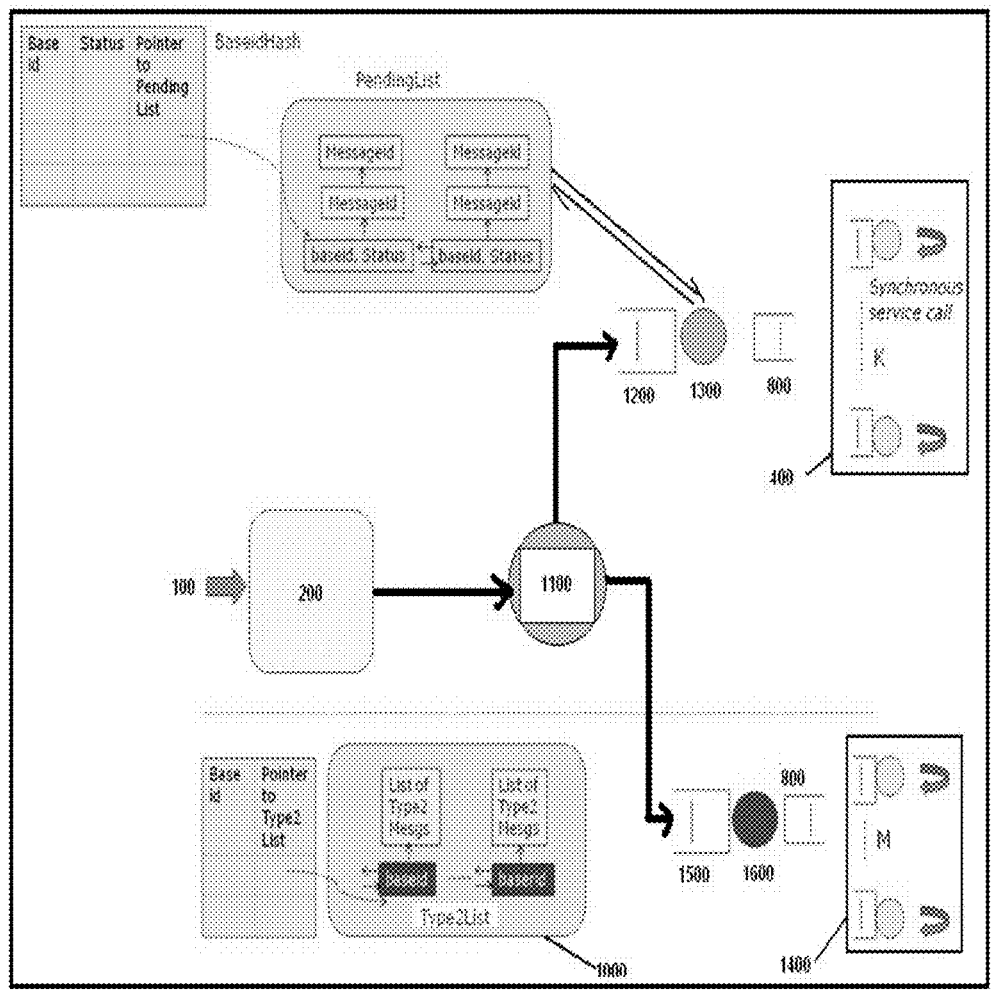
FIG. 5 of the present invention illustrates a system and method for scheduling both the type 1 and type 2 messages simultaneously and providing optimal allocation of messages under serialization requirements R1 and R2.

FIG. 5 of the present invention illustrates a system and method for scheduling both the type 1 and type 2 messages simultaneously and providing optimal allocation of messages under serialization requirements R1 and R2.

Incoming messages 100 are received by the scheduler system which are stored in a memory cache 200; and are further accessed and separated by the router 1100 based on the type of message.

The type 1 messages 100(*a*) are indexed based on the messageid and baseid 700 by the type 1 first message queue 1200 of the type 1 dispatcher 1300;

Further, the type 2 messages 100(*a*) are indexed based on the messageid and baseid 700 by type 2 first message queues 1500 of the type 2 dispatchers 1600.

Further, the type 1 dispatcher 1300 checks for the serialization requirement R1 against the type 1 message 100(*a*), if there are no serialization conflicts then the type 1 message 100(*a*) is dispatched to the idle K outbound message processing servers 400 for processing. But, if there is a serialization conflict, then the dispatcher 600 dispatches the messageid to the pending list 900 of the dispatcher 600.

The logic for K outbound message processing servers 400 is given below:

```
loop forever
    Wait on queue for next message id;
    Receive messageid;
    Pull out corresponding message from in memory message cache;
    Invoke service for given message and wait for response;
    Send <Serverid, baseid> to SvcOverQ;
end loop
```

Further, service over message queue "SvcOverQ" 800 is used to communicate the process status of the K outbound message processing servers 400 to the dispatcher 600.

During initialization of the scheduler system, the service over message queue "SvcOverQ" 800 has one type 1 message 100(*a*) for each K outbound message processing servers 400 signifying that all these K outbound message processing servers 400 are ready to do work.

Further, service over message queue "SvcOverQ" 800 provides whether a given process has been completed (Serverid is given for this purpose) by the K outbound message processing server 400.

On completion of the given process by the K outbound message processing server 400; the service over message queue "SvcOverQ" 800 communicates the same to the dispatcher 600.

The dispatcher 600 works only if there is an idle K outbound message processing server 400 available to start the processing.

According to another embodiment of the present invention, the dispatcher 600 reads the type 1 messages 100(*a*) from type 1 first message queue 1200 and puts them in the pending message list 900 if they conflict with an existing baseid for a type 1 message 100(*a*) being processed. If there is no conflict then the type 1 message 100(*a*) is directly sent to the K outbound message processing servers 400.

The incoming type 1 messages 100(*a*) are given priority over pending messages in the pending message list 900. The dispatcher 600 further switches to the pending message list 900 to send the pending messages to the K outbound message processing servers 400, when there are no more type 1 messages 100(*a*) to be processed.

Further, the "baseid" of the message is set to status "idle"; so that any other idle K outbound message processing servers 400 can pick up the next baseid in the queue for further processing and thereby ensures that the type 1 messages 100(*a*) for a given baseid are not bound to any particular K outbound message processing servers 400.

Once the baseid message is picked up by the idle K outbound message processing servers 400 from the pending message list 900; the status of baseid is changed to "processing"; thereby ensuring that no other baseid message is being processed until the service at the K outbound message processing servers 400 is completed and thereby fulfills the serialization requirement R1 along with optimal load balancing.

According to another embodiment of the present invention, the type 2 messages 100(*a*) are indexed based on the messageid and baseid 700 by type 2 first message queues 1500 of the type 2 dispatchers 1600.

The type 2 dispatcher 1600 reads the type 2 messages 100(*b*) from type 2 first message queue 1500 and puts them in the third message queue "type2list" 1100; if the type 2 message 100(*b*) conflicts with an existing baseid message being processed.

But, if there is no conflict then the type 2 message is directly sent to the M bound output server 1400 for processing the type 2 messages 100(*b*).

The logic for M outbound message processing servers 1400 is given below:

```
loop forever
    Wait on queue for next message id;
    Receive messageid;
    Pull out corresponding message from in memory message cache;
    Invoke service for given message and wait for response;
    Send <Serverid, baseid> to SvcOverQ;
end loop
```

In this way, both type 1 and a type 2 message are processed separately by the scheduler system as described in FIG. 5 and thereby fulfills the serialization requirement R1 and R2 along with optimal and lightweight load balancing.

According to another embodiment of the invention, a method for preemptive priority scheduling of messages in an intersystem communication causing dynamic class switching of messages corresponding to a selected serialization constraint, the method comprises the various computer implemented steps.

In the initial step of the proposed method, receiving a plurality of inbound messages 100 associated with a plurality of message classes from a front office in a serialized sequence into a cache memory 200 of the front office system, each message having pre-assigned priority and a unique messageid and a class thereof a unique baseid, wherein all the related messages corresponding to at least one pre-identified business activity have the same baseid;

In the next step of the proposed method, indexing each inbound message residing therein the cache memory 200 of the front office system according to a serialization constraint, assigned baseid and messageid into an input message queue 500, wherein the serialization constraint comprising of fully restrictive, partially restrictive and non restrictive constraints, each constraint allowing to identify priority of each class of the inbound message 100 and subsequent processing thereof by a scheduling system;

In the next step of the proposed method, receiving at least one synchronous service call from at least one output service server process running on at least one message output server 400 having a unique serverid for fetching at least one message from the cache memory 200;

In the next step of the proposed method, communicating a work status of the outbound message processing server's 400 to a dispatcher 600, wherein the dispatcher 600 is communicatively coupled with the cache memory 200 of the front office system and is dynamically configurable to adapt to at least one serialization constraint;

In the next step of the proposed method, assigning at least one message of at least one class, indexed in the input message queue 500, to at least one output server process according to predetermined priority thereof for priority based preemptive message transmission to at least one back office node in accordance with at least one selected message serialization constraint;

In the next step of the proposed method, creating a pending list 900 and a restrictive list 1000 of messages for swapping the lower priority messages and for further processing thereof in accordance with the associated serialization constraint therewith, wherein the dispatcher 600 swapping and indexing the messageids associated with the lower priority messages and fetching the conflicting messageid from the input message queue 500 in response to the service call from at least one output server process;

In the next step of the proposed method, creating a linked list hash table for storing a pointers for the lower priority messages in the pending list 900 and restrictive list 1000, wherein the hashing is performed in relation to a baseid of each message;

In the next step of the proposed method, transmitting the messages in first come first serve order to at least one back office system;

In the next step of the proposed method, communicating the completion of each message processing associated with each output server, wherein a service over queue 800, communicatively connected to the dispatcher 600, adapted to assigning at least one message to at least one output server process and updating a server process completion flag accessible by the dispatcher 600, enabling the dispatcher 600 to resume dispatching of at least one new message from the input message queue 500 to at least one output server process; and In the final step of the proposed method, repeating iteratively the message server processes in accordance with the serialization constraint for the messages in the input queue.

The system and method of the proposed invention has various advantages, some of them are as mentioned below:
- provides a system and method for priority queuing with dynamic class switching and with allocation constraints;
- Provides and implements the scheduler design for priority scheduling;
- Enables to execute the messages in micro seconds with largest overhead being the queue read and queue write;
- Enables optimal load balancing of messages while preserving serialization constraints; and
- Provides an optimal and lightweight method for prioritizing the scheduling of messages.

The preceding description has been presented with reference to various embodiments of the invention. Persons skilled in the art and technology to which this invention pertains will appreciate that alterations and changes in the described structures and methods of operation can be practiced without meaningfully departing from the principle, scope of this invention.

I claim:

1. A preemptive priority scheduling system providing serialization by dynamic switching of a plurality of messages of a plurality of classes in an intersystem communication, the system comprising of:
an intersystem communication comprising a front office to handle a plurality of predefined first set of business operations and a back office to handle plurality of second set of business operations, the back office receiving a plurality of messages from the front office in a serialized sequence;

a plurality of inbound messages, each message assigned to a pre-identified class, comprising at least one highest priority message, at least one medium priority message and at least one lowest priority message stored in a cache memory of the front office system, wherein each message is assigned with a unique messageid and a class of messages corresponding to at least one pre-identified business activity is assigned a unique baseid;

an input message queue to index the queue with messageid and baseid of at least one message residing therein the cache memory of the front office system;

a plurality of output server processes running on at least one message output server identified by an assigned serverid thereof, wherein each output server process invokes a synchronous service call to fetch at least one message from the cache memory corresponding to the indexed messageid in the input message queue and sending messages in first come first serve order to at least one back office system;

at least one serialization constraint, pre-identified for priority based message scheduling, comprising of fully restrictive, partially restrictive and non restrictive constraints, each constraint allowing to identify priority of each class of the inbound message and subsequent processing thereof by a scheduling system;

a pending list comprising indexed messageid of a pre-identified at least one class of messages having medium priority messages with serialization conflict with the highest priority messages and one or more other priority message classes, wherein the conflicting messageid is fetched from the input message queue in response to the service call from at least one output server process;

a restrictive message list comprising indexed baseid of at least one class of messages having lowest priority messages with serialization conflict with the highest priority messages and one or more other priority message classes, wherein the baseid is linked to a linked list pointer thereof;

a dispatcher, communicatively coupled with the cache memory of the front office system, dynamically configurable to adapt to at least one serialization constraint, wherein the dispatcher assigns at least one message of at least one class, indexed in the input message queue, to at least one output server process according to predetermined priority thereof for priority based preemptive message transmission to at least one back office node in confirmation with at least one selected message serialization constraint; and a service over queue, communicatively connected to the dispatcher, to assign at least one message to at least one output server process and updating a server process completion flag accessible by the dispatcher, enabling the dispatcher to resume dispatching of at least one new message from the input message queue to at least one output server process.

2. The preemptive priority scheduling system of claim 1, the dispatcher in the fully restrictive serialization constraint, accesses at least one message from the input message queue in a first come first serve order, compute at least one output server process corresponding to a modulus of the baseid of the message and routes the accessed message to the at least one computed output server process in response a synchronous service call therefrom.

3. The preemptive priority scheduling system of claim 1, the dispatcher for the fully restrictive serialization constraint assigns at least one non-conflicting messageid to at least one idle message output process for further processing thereof.

4. The preemptive priority scheduling system of claim 1, the dispatcher in the partially restrictive serialization constraint, accesses at least one message from the input message queue and upon countering true for serialization conflict with at least one existing baseid, swapping the associated message into the pending list and in a non conflicting event continue dispatching the highest priority message to at least one output server process for serialized processing thereof and upon detecting null of the input queue, resume the message processing from the pending list on at least one output server process.

5. The preemptive priority scheduling system of claim 1, the dispatcher in the partially restrictive serialization constraint, wherein a service over queue contains at least one serverid, baseid and the server process completion flag and to assign at least one message to at least one output server process and updating a server process completion flag accessible by the dispatcher, enabling the dispatcher to resume dispatching of at least one new message from the input message queue to at least one output server process.

6. The preemptive priority scheduling system of claim 1, a baseidhash table for the dispatcher for the partially restrictive serialization constraint contains baseid, status associate with the baseid, and pointer to the pending list.

7. The preemptive priority scheduling system of claim 1, the dispatcher in the partially restrictive serialization constraint, wherein the server process completion flag of the service over queue indicates a true status for a previous processed message is a medium priority message and a false status for an earliest non processing thereof.

8. The preemptive priority scheduling system of claim 1, the dispatcher in the partially restrictive serialization constraint, wherein in an event of true for the service over queue, a cleanup operation is initiated, hashing the status thereof into a BaseidHash table, a linked list of the pending list, referring to the pointer therein to the pending list associated with the currently processed baseid, indicating null for BaseidHash table in the absence of at least one medium priority message in the pending list and deletes the baseid node in the pending list.

9. The preemptive priority scheduling system of claim 1, the dispatcher in the non restrictive and partially restrictive serialization constraints, wherein for the false status of the pending list indicating absence of at least one medium priority message associated to a baseid in the pending list, nullifying the pointer to pending list in the BaseidHash table, removing the associated baseid from the BaseidHash table for null of pending list and restrictive list pointers.

10. The preemptive priority scheduling system of claim 1, the dispatcher in the non restrictive serialization constraint comprising of the restrictive message list containing at least one lowest priority message, the pending message list containing at least one medium priority message, and the input message queue containing at least one highest priority message pre-identified for a default transmission, wherein each of the medium and lowest priority message processes message according to predefined serialization constraint and at least one message server process is always accessible to each highest priority message.

11. The preemptive priority scheduling system of claim 1, a BaseidHash table for implementation of the dispatcher for the non restrictive serialization constraint contains baseid, status associated with the baseid, pointer to pending list and a pointer to the restrictive list.

12. The preemptive priority scheduling system of claim 1, the BaseidHash table for implementation of the non restrictive serialization constraint, wherein for processing at least one lowest priority message, a baseid verification in the BaseidHash table corresponding to the lowest priority message is done, upon detecting null status of the restrictive list pointer, a new baseid node is created, restrictive list and a corresponding pointer thereof is indexed into the hash table, the associated messageid is inserted in to the linked list for the newly created node.

13. The preemptive priority scheduling system of claim 1, wherein while processing of at least one class of messages corresponding to priority thereof, the other classes of messages, excluding the highest priority messages, are blocked form processing on any of the output server process.

14. The preemptive priority scheduling system of claim 1, wherein while processing of at least one class of messages corresponding to priority thereof, a dynamic class switching occurs upon detection of true state of at least one corresponding flag of associated message list, indicating availability of output processing server corresponding to the baseid thereof.

15. The preemptive priority scheduling system of claim 1, wherein a water mark flag bind to at least one class of message having lower priority, is accessible to the dispatcher and the water mark flag of the class is coupled with at least one output message processing server through a switching routine, the switching routine switching the processing from highest priority message class to the coupled water mark flagged class.

16. The preemptive priority scheduling system of claim 1, the dispatcher for every dynamic class switching and processing of each message on associated output server process, detects the presence of water mark flag on the lower priority classes of messages wherein the dispatcher dynamically reserves and assigns output server process to serve each low priority class corresponding to the water mark according to the pre-identified serialization constraints thereof.

17. A method for preemptive priority scheduling of messages in an intersystem communication causing dynamic class switching of messages corresponding to a selected serialization constraint, the method comprises the computer implemented steps of:

receiving a plurality of inbound messages associated with a plurality of message classes from a front office in a serialized sequence into a cache memory of the front office system, each message having pre-assigned priority and a unique messageid and a class thereof a unique baseid, wherein all the related messages corresponding to at least one pre-identified business activity have the same baseid;

indexing each inbound message residing therein the cache memory of the front office system according to a serialization constraint, assigned baseid and messageid into an input message queue, wherein the serialization constraint comprising of fully restrictive, partially restrictive and non restrictive constraints, each constraint allowing to identify priority of each class of the inbound message and subsequent processing thereof by a scheduling system;

receiving at least one synchronous service call from at least one output service server process running on at least one message output server having a unique serverid for fetching at least one message from the cache memory;

communicating a work status of the outbound message processing server's to a dispatcher, wherein the dispatcher is communicatively coupled with the cache memory of the front office system and is dynamically configurable to adapt to at least one serialization constraint;

assigning at least one message of at least one class, indexed in the input message queue, to at least one output server process according to predetermined priority thereof for priority based preemptive message transmission to at least one back office node in accordance with at least one selected message serialization constraint;

creating a pending list and a restrictive list of messages for swapping the lower priority messages and for further processing thereof in accordance with the associated serialization constraint therewith, wherein the dispatcher swapping and indexing the messageids associated with the lower priority messages and fetching the conflicting messageid from the input message queue in response to the service call from at least one output server process;

creating a linked list hash table for storing a pointers for the lower priority messages in the pending list and restrictive list, wherein the hashing is performed in relation to a baseid of each message;

transmitting the messages in first come first serve order to at least one back office system;

communicating the completion of each message processing associated with each output server, wherein a service over queue, communicatively connected to the dispatcher, assigns at least one message to at least one output server process and updating a server process completion flag accessible by the dispatcher, enabling the dispatcher to resume dispatching of at least one new message from the input message queue to at least one output server process; and repeating iteratively the message server processes in accordance with the serialization constraint for the messages in the input queue.

* * * * *